United States Patent [19]
Woodard

[11] Patent Number: 5,189,551
[45] Date of Patent: * Feb. 23, 1993

[54] SOLAR SCREENING FILM FOR A VEHICLE WINDSHIELD

[75] Inventor: Floyd E. Woodard, Olivette, Mo.

[73] Assignee: Monsanto Company, St. Louis, Mo.

[*] Notice: The portion of the term of this patent subsequent to Jul. 24, 2007 has been disclaimed.

[21] Appl. No.: 385,527

[22] Filed: Jul. 27, 1989

[51] Int. Cl.$^5$ .............................. G02B 5/26; G02B 5/28
[52] U.S. Cl. ............................... 359/360; 359/585; 359/589; 359/601; 428/423.1; 428/457
[58] Field of Search ............. 350/1.7, 164, 166, 276 R, 350/276 SL, 319; 296/84.1, 96.19; 219/203; 359/350, 359, 360, 580, 585, 588, 589, 601, 885, 894; 428/423.1, 430, 457, 458

[56] References Cited

U.S. PATENT DOCUMENTS

| | | | |
|---|---|---|---|
| 2,593,525 | 4/1952 | Beckham | 296/96.19 |
| 2,676,114 | 4/1954 | Berkley . | |
| 3,026,763 | 3/1962 | Marks | 350/164 |
| 3,078,693 | 2/1963 | Lytle | 350/1.7 |
| 3,208,070 | 9/1965 | Boicey | 296/84.1 |
| 3,236,290 | 2/1966 | Lueder . | |
| 3,400,972 | 9/1968 | McIntyre et al. | 350/276 R |
| 3,473,863 | 10/1969 | Lewis | 350/276 R |
| 3,516,720 | 6/1970 | Mauer . | |
| 4,010,304 | 3/1977 | Cohen | 219/203 |
| 4,017,661 | 4/1977 | Gillery . | |
| 4,368,945 | 1/1983 | Fujimori et al. . | |
| 4,528,232 | 7/1985 | Cliffe | 350/276 R |
| 4,556,277 | 12/1985 | Fan et al. | 350/1.7 |
| 4,786,783 | 11/1988 | Woodard | 219/203 |
| 4,797,317 | 1/1989 | Oliver . | |
| 4,799,745 | 1/1989 | Meyer et al. | 350/1.7 |
| 4,965,121 | 10/1990 | Young et al. | 350/1.7 |

FOREIGN PATENT DOCUMENTS 8602038  4/1986  World Int. Prop. O. ......... 350/166

Primary Examiner—Bruce Y. Arnold
Assistant Examiner—R. D. Shafer
Attorney, Agent, or Firm—Michael J. Murphy; William J. Farrington

[57] ABSTRACT

A solar screening film for a motor vehicle windshield comprises an interference filter having one or more heat reflecting metal layers and one or more coacting reflection-suppressing layers to minimize reflection and enhance visible transmission and a gradient band continuation of the interference filter above the direct line of forward vision through a windshield when the film is disposed therein in a motor vehicle, for reflective rejection of infra-red solar energy, such band including a light-reflecting metal layer gradually increasing in thickness toward an edge of the film.

6 Claims, 3 Drawing Sheets

SOLAR SCREENING FILM FOR A VEHICLE WINDSHIELD

BACKGROUND OF THE INVENTION

This invention relates to reducing heat buildup in a motor vehicle and more particularly to doing so by the structure of the windshield.

Windshields of vehicles such as automobiles are conventionally of laminated glass comprising thermoplastic interlayer, such as plasticized polyvinyl butyral or polyurethane sheeting, sandwiched between two layers of glass. These assemblies are mounted in openings across the upper front ends of the vehicle bodies and, in modern designs, are inclined backwardly at a substantial angle from the vertical thereby admitting sunlight into large areas of the vehicle interior. The interlayer conventionally has an integral marginal band of light-absorbing dye above the driver's direct line of vision through the windshield to reduce sunlight glare. This band is graduated in intensity, being greatest near the upper periphery of the interlayer when in place in a windshield and gradually diminishing to an almost imperceptible level at the lower edge of the band.

Solar screening films have been incorporated into these assemblies to reduce solar radiation influx while maintaining high luminous or visible light transmission, thus reducing temperature buildup within the vehicle from exposure to the sun's rays without adversely affecting visibility through the windshield. Such films are called interference or induced transmission filters and comprise a multi-layer coating of at least one layer of reflective metal sandwiched between reflection-suppressing dielectric layers. Representative structures for motor vehicle windshields are disclosed in International Publication No. WO88/01230 and U.S. Pat. No. 4,799,745.

For safety purposes windshields containing solar screening films must still comply with a federally mandated 70% minimum luminous transmission level in the area of the driver's direct field of view, and for convenience should desirably still have the capability of minimizing glare. Moreover, there is a recent trend toward extending windshields back into the roof panel to provide a more open, spacious feeling to the occupants. The level of solar flux against an overhead windshield extension in the roof area, which is orthogonal to the sun's rays, is essentially maximum. However, absorptive solar rejection by a dyed band or by heat absorbing glass has little effect on control of the internal equilibrium temperature of a vehicle parked in direct sunlight, because absorbed heat contributes substantially to increasing the interior vehicle temperature. Furthermore, though reducing luminous transmission in the visible region, a dyed gradient band provides no attenuation in the near infra-red region (700-3000 nm).

SUMMARY OF THE INVENTION

Now improvements have been made in motor vehicle windshields containing solar energy control features which overcome or mitigate prior art shortcomings.

Accordingly, a principal object of this invention is to provide an improved solar screening film for a motor vehicle windshield.

An additional object is to provide a solar screening film for a motor vehicle windshield which has an improved form of the anti-glare gradient band usually found in modern windshields.

Another object is to provide such a film which is capable of increased suppression of equilibrium temperatures reached within the vehicle during solar soaking, for example during parking lot exposure, while simultaneously exhibiting good transmission performance in the visible spectra range.

A further object is to provide such a film with a gradient band capable of reflective rather than absorptive solar rejection.

Other objects of this invention will in part be obvious and will in part appear from the following description and claims.

These and other objects are accomplished by providing a solar screening film for a motor vehicle windshield comprising an interference filter which includes one or more light-reflecting metal layers and one or more reflection-suppressing layers for coacting with the one or more metal layers to minimize reflection and enhance visible transmission, and a gradient band continuation of such filter above the direct line of vision through a windshield when the film is disposed therein, for reflective rejection of solar energy, such band including a light-reflecting metal layer gradually increasing in thickness toward an edge of the film.

The thickness of the metal layer of the gradient band continuation preferably increases to about 200 to 1000 Angstroms (A) from about 60 to 200 A at the confluence with the interference filter segment. The gradient band continuation preferably includes extensions of the reflection-suppressing layers of substantially the same thickness as in the interference filter. When a windshield extension is intended, the metal layer continuation extends preferably into the roof line of the vehicle at a thickness greater than the minimum thickness of the metal layer extension, for example at essentially the same thickness as that of the maximum thickness of the wedge-shaped profile of the gradient band thickness.

BRIEF DESCRIPTION OF THE DRAWINGS

In describing the invention, reference will be made to the accompanying drawings wherein.

DETAILED DESCRIPTION OF THE INVENTION

Figure 1:
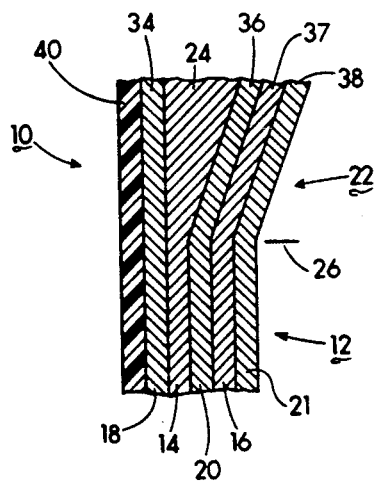
FIG. 1 is a partial, cross sectional view of a solar screening film according to the invention.

Referring now to the drawings, solar screening film 10 in FIG. 1 for motor vehicle windshield W (FIG. 2) comprises a high-transmission interference filter segment 12 in the form of a multi-layer coating which, in the embodiment shown, includes two light-reflecting silver metal layers 14, 16 of substantially uniform thickness separated by dielectric spacer layer 20, with two opposing planar surfaces of each of 14, 16 being in face-to-face contiguous engagement with reflection-suppressing dielectric layers 18, 21.

Solar screening film 10 further comprises gradient band continuation 22 of high-transmission interference filter 12 above the direct line of forward vision through windshield W when solar screening film 10 is disposed therein in a motor vehicle, for reflective rejection of solar energy. Gradient band continuation 22 includes extension 24 which is preferably integral with light-reflecting metal layer 14 and is wedge-shaped in thickness profile insofar as gradually upwardly increasing (though not necessarily linearly) toward a marginal edge of solar screening film 10. Extension 24 need not be integral with a metal layer of the high-transmission interference filter segment 12, but alternatively could be deposited as a separate gradient layer, for example on the outboard surface of layer 38, which is further identified below.

Figure 2:
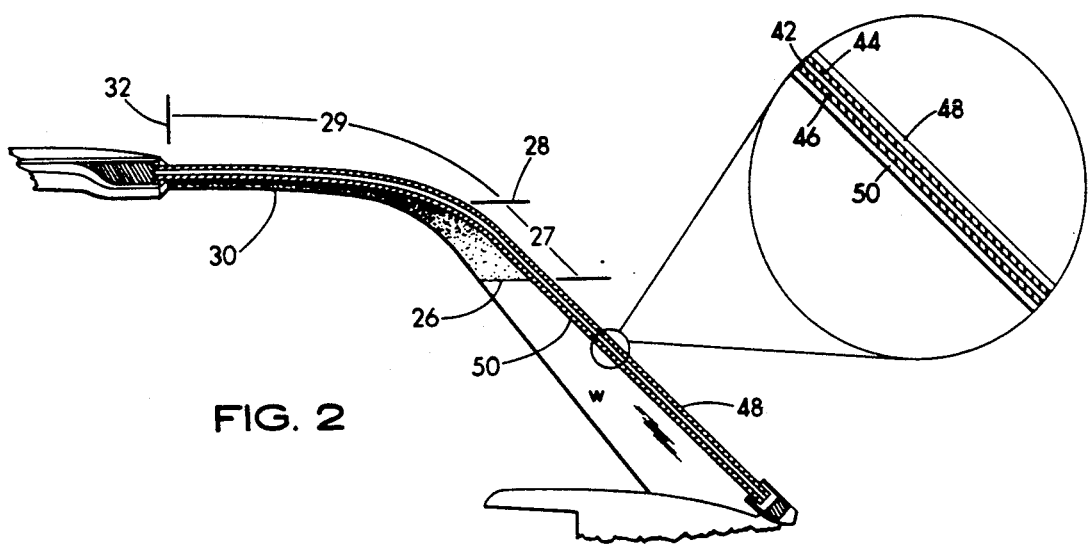
FIG. 2 is a central, vertical, sectional view of a vehicle windshield and windshield extension containing the solar screening film of FIG. 1 highlighted in enlarged form within a circumscribing circle.

The direct line of forward vision through windshield W is the high visibility area subjacent imaginary line 26 in FIG. 2. The location of line 26 in windshields of U.S. vehicles is usually defined by the label "AS1" imprinted on one of the glass layers. The wedge-shaped integral gradient band continuation 22 is schematically highlighted in FIG. 2 by the gradual increase in multiple dot shading intensity from confluence 26 with interference filter segment 12 to marginal edge 28. Continuation 22 of solar screening film 10 when in windshield W encompasses zone 27 between lines 26, 28 which is about the upper ⅓ of the windshield and is above the direct line of forward vision through windshield W.

When optional windshield extension 30 (FIG. 2) is present, solar screening film 10 preferably includes a high reflection region 29 comprising a further continuation of metal layer 24 having a thickness greater than the minimum thickness, and exemplarily essentially equal to the maximum thickness of wedge-shaped extension 24 of gradient band 22. Extension 30 encompasses zone 29 within imaginary lines 28, 32.

Gradient band continuation 22 includes extensions 34, 36 and 38 (FIG. 1) of each of reflection-suppressing dielectric layers 18, 21 and spacer layer 20 of high-transmission interference filter 12, of substantially uniform thickness, which is substantially the same as the thickness of layers 18, 20, 21. Continuation 22 further includes unthickened metal layer extension 37 of metal layer 16 of high-transmission segment 12.

Solar screening film 10 is supported on a transparent substrate which, in the FIG. 1 embodiment, is thermoplastic sheet 40 of biaxially oriented polyethylene terephthalate. Before incorporation into windshield W, the composite laminate of solar screening film 10 on transparent substrate 40, which is illustrated as 42 within the circle in FIG. 2, is preferably sandwiched between and laminated by heat and pressure to two layers of plasticized polyvinyl butyral 44 and 46 (FIG. 2). In preparing windshield W, the encapsulate of sandwich components 42, 44 46, is further laminated in conventional manner between outer float glass layers 48,50.

Figure 3:
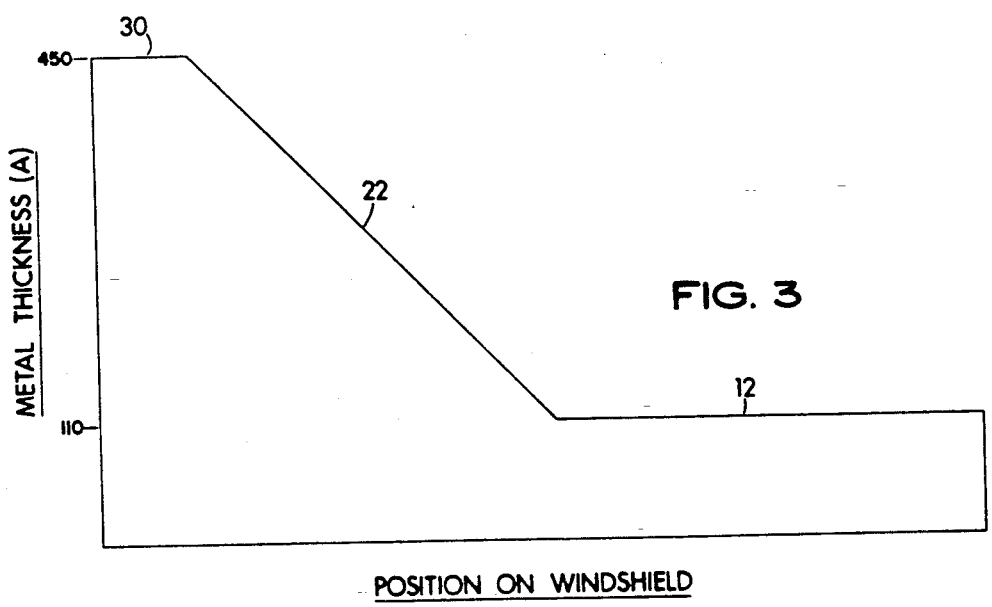
FIGS. 3 and 6 are schematic illustrations of the thickness profile of solar screening films of the invention.

FIG. 3 schematically illustrates the metal layer thickness profile of a typical embodiment of solar screening film 10. The thicknesses of layers 14, 16 in the high visibility region of windshield W below 26 containing interference filter 12 are 110A. The thickness of metal layer 24 of gradient band 22 gradually increases from about 60 to 200 A (e.g. 110A as shown) at the confluence (26 in FIG. 2) with the upper edge of interference filter 12 up to about 200 to 1000 A (e.g. 450A as shown) at the marginal edge (28 in FIG. 2) of film 10 in the absence of a windshield extension. Alternatively, without extension 30, layer 24 may have a vertically short constant thickness portion at the upper end of the tapered section. With extension 30 present, high reflectance region 29 typically has essentially the same thickness (450A in FIG. 3) as that of the maximum thickness of the wedge-shaped thickness profile of gradient band 22.

Figure 6:
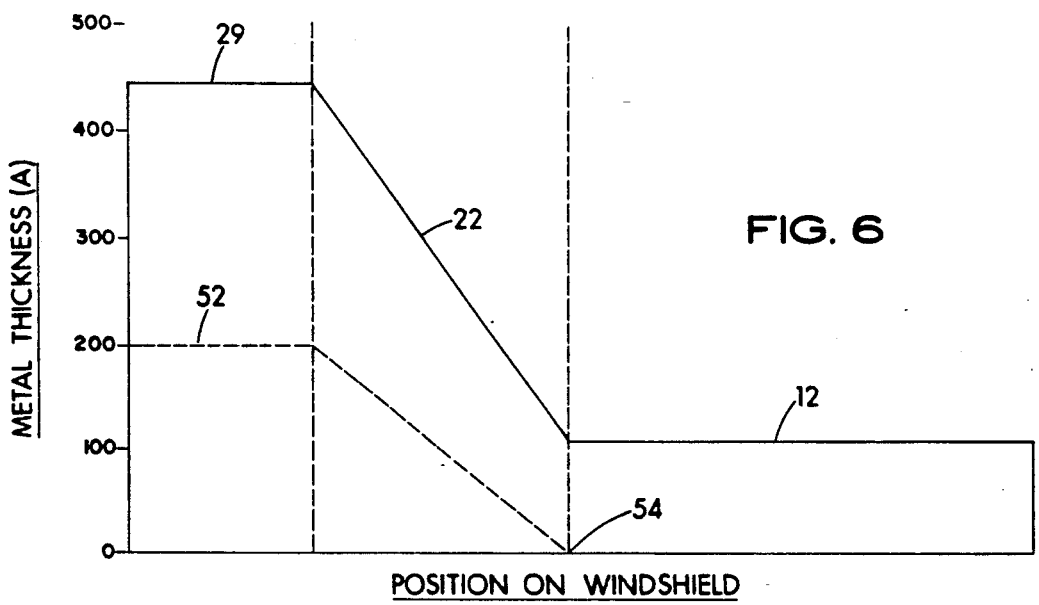

FIG. 6, schematically illustrates an optional, anti-glare feature. An anti-glare backing is positioned behind the integral gradient band continuation for suppressing luminous reflection by absorption from within the vehicle compartment when solar screening film 10 is disposed in windshield W. Such anti-glare backing comprises gradient metal layer 52 aligned behind gradient band continuation 22 commencing (zero thickness) at the confluence 54 of interference filter 12 and gradient band continuation 22, and complementing the thickness profile of gradient band continuation 22 insofar as gradually increasing to about 200A opposite the maximum thickness end of band 22 and then, if a windshield extension is present, continuing parallel to high reflectance region 29 at a constant level of 200A. The relative thickness of layer 52 need not be linear or proportional to that of section 22 and is chosen to balance glare suppression while retaining reasonable transmission.

The interference filter component of the solar screening film of the invention is of the Fabry-Perot type designed principally through the appropriate selection of materials and thicknesses to maximize i) transmission of visible or luminous (300–700 nm) and ii) reflection of heat-generating infra-red (700–3000 nm) portions of the solar spectrum. Such filter consists of multiple, sequentially deposited successive planar layers of angstroms-thick metal and dielectric coatings arranged in a predetermined sequence in face-adhering, contiguous contact with each other, of the type generally disclosed in U.S. Pat. Nos. 3,682,528, 4,179,181 and 4,799,754.

The interference filter component must contain one, preferably two or more heat (near IR) reflecting metal layers which, when operatively positioned in a windshield in the direct line of forward vision of an occupant such as the driver, provide at least 70% visible light transmission of normal incidence measured as specified in ANSI Z26.1, which is the minimum allowed by the U.S. automotive industry. Preferably visible light reflectance, normal from the surface of the filter is less than 16%. The metal layers of the interference filter must be vertically separated in the thickness direction from each other by one or more dielectric layers conventionally used in interference filters which coact with the one or more metal layers so reflections of visible light from various interfaces interfere destructively thereby enhancing visible transmission.

The gradient band component reflectively rejects near infra-red solar energy and is an integral extension of a light-reflective metal layer of the interference filter component of gradually increasing thickness toward an upper marginal edge of the solar screening film. Though more than one metal layer may be present and desirable to enhance visible transmission performance in the high-transmission interference filter segment, it is generally unnecessary (though possible if desired) to thicken more than one of such layers in the gradient band continuation, since two or more gradient metal layers tend to produce a) more than one color across the gradient band and b) non-uniform color due to slight variations in layer thicknesses. As metal layer thickness increases across the region defined by such gradient metal band component, solar and luminous reflection increases, luminous transmission decreases and solar rejection increases.

Usable metals in the solar screening film comprise silver, aluminum, chrome, nickel, brass, gold, stainless steel, copper, palladium and alloys or claddings of any of the foregoing. Silver is preferred. Each metal layer should be continuous to maximize visible light transmission and near infra-red solar rejection properties.

The metal layer(s) thickness in the high-transmission interference filter segment should be between 60 to 200, preferably 70 to 180 and most preferably 80 to 160A. For maximum reflection attenuation by the interference filter, when using plural (for example two) metal layers, reflection from each should be equal and this is best achieved by having the thickness and composition of each layer nearly identical.

Metal layer thickness of the gradient band continuation at the confluence with the interference filter segment is the same as the thickness of the layer of which it is an extension, which, as presented above, is 60 to 200, preferably 70 to 180 and most preferably 80 to 160 A. This thickness gradually, though not necessarily linearly, increases to a maximum near the roof line of the vehicle which can vary widely depending on desired performance, but is generally about 200 to 1,000, preferably about 300 to 600A. When a windshield extension (which can be the entire vehicle roof) is present and it is desired to extend the solar screening film into such area by including a high reflectance region, the metal layer thickness in such region is greater than that of the gradient band continuation at the confluence with the interference filter, but can otherwise vary widely. For convenience, the metal layer thickness in such high reflectance region is constant and substantially equal to the maximum thickness of the gradient band continuation which, as indicated, is generally about 200 to 1,000, preferably 300 to 600A.

The dielectric layer(s) of the solar screening film must be essentially transparent over the solar range (i.e. form 325 to 2125 nm) and at least one must exist between a pair of metal layers when plural layers are in the interference filter element. Exemplary usable dielectric materials include SiO, $Sio_2$, $Ta_2O_5$, $WO_3$ ... $SnO_2$, $Al_2O_3$, $MgF_2$, ZnS, and $ZnO_2$. $TiO_2$ is preferred for each dielectric layer.

As generally known, varying the thickness and composition of a dielectric layer spaced between two reflecting metal layers, will considerably vary the optical transmittance/reflection properties of the interference filter. More specifically, varying the thickness of the spacing dielectric layer varies the wave length associated with the reflection suppression (or transmission enhancement) band. Generally, the thickness of spacing dielectric layer(s) in the solar screening film should be between about 200 to about 1200 and preferably between 450 to 1000 A to obtain the desired optical properties for a commercially acceptable product. Metal oxide dielectric layers less than about 200 or more than about 1200 A result in very low luminous transmittance.

Exterior dielectric layers contacting metal layer surfaces opposite to metal surfaces contacting spacing dielectric layer(s) are preferably used in the interference filter element to enhance anti-reflection performance. Exterior dielectric layers generally should have a higher refractive index than glass i.e. greater than 1.5 and preferably greater than 1.8. The thickness of such exterior or outside dielectric layer(s) is generally less than the spacing dielectric layer(s) and should be about 100 to about 600 and preferably 160 to 500A.

Reflection-suppressing dielectric layers of substantially uniform thickness are preferably present in the gradient band continuation segment and optional high glare region of the solar screening film as extensions of and at substantially the same thickness of the reflection-suppressing layers of the interference filter. Their presence i) provides a suitable surface to which the deposited metal layer will adhere; ii) minimizes agglomeration of the metal layer deposited thereon; iii) provides chemical and mechanical protection for the metal layer and iv) maximizes visible transmission for a given solar rejection.

The solar screening film of the invention rests in supporting face to face contact on the surface of a transparent substrate which itself can comprise one or plural layers. Such substrate can be selected from a variety of materials with choice generally governed by compatibility between the solar screening film and the substrate. Usable substrates should not be prone to stretch to avoid cracking the metal/dielectric layers and should be free of excess volatiles such as plasticizers, water vapor or absorbed gases. The dielectric layer of the solar screening film in direct contact with the substrate should adhere well to the substrate surface. Generally the solar screening film of the invention will adhere well to glass and certain flexible plastics such as polyesters, cast acrylics, polycarbonates, chlorinated plastics and epoxies. Polyurethanes and plasticized polyvinyl butyral as a substrate component in direct supportive contact with the solar screening film are too soft and extensible. Preferred substrates are sheets of transparent materials such as glass or non-extensible flexible plastics such as linear polyesters, e.g. molecularly oriented (i.e. biaxial or uniaxial) polyethylene terephthalate which is commercially available from Hoechst-Celanese Company as Hostaphan 4400–400. In a preferred construction the layers of the solar screening film are sequentially deposited on a flexible sheet substrate of biaxially oriented polyethylene terephthalate (PET), and then the substrate carrying the solar screening film is encapsulated within two layers of conventional plasticized polyvinyl butyral (PVB), one layer abutting the PET substrate and the other abutting the top layer of the solar screening film. The multi-layered encapsulate or sandwich containing PVB as the outer layers is then conventionally laminated between two rigid members such as glass panes, or alternatively may be used as a bilayer structure where lamination is to only one such rigid member.

Individual layers of the solar screening film are deposited by known vacuum coating techniques such as vacuum evaporation or sputtering. Usable methods include evaporation (resistance or laser heated, or electron-beam vaporization) and sputtering (diode or magnetron) under normal or reactive conditions. Magnetron sputtering is preferred. A layer of graduated metal thickness may be deposited in any of several ways as follows:

(1) The speed of the substrate can be varied to change the duration of deposition on different regions of the substrate.

(2) The target area exposed to the substrate can be varied to provide the appropriate thickness profile such as by masking rectangular targets or using one or more shaped targets.

(3) A single target might be segmented to allow a different voltage to be applied to each segment. Those segments with higher applied voltages would have correspondingly higher deposition rates.

(4) The rate enhancing magnetic fields can be varied to achieve faster deposition in selected areas of the target.

The invention is further described in the following examples which are for illustration only and not intended to imply any limitation or restriction on the invention.

Samples described in Examples were prepared on 5 cm square or 5×15 cm 90 mm thick glass plate substrates. Prior to deposition of the solar screening film thereon, each glass plate was mechanically washed in detergent solution then rinsed and immersed in a 50/50 volume % solution of concentrated sulfuric acid and 30% hydrogen peroxide. After removal the plates were rinsed in distilled water and isopropanol, blown dry with nitrogen and placed in a vacuum chamber of the sputter coating apparatus.

All vapor deposited layers were sequentially applied one on top of the other by magnetron sputtering using a Leybold Heraeus Z400 sputter coater, the first layer being deposited on the glass plate surface. Tungsten oxide was reactively prepared using round metallic targets which had a diameter of about 7.5 cm and an area of about 44 square centimeters. Layer thicknesses were monitored using an Inficon XTC crystal monitor.

After the vacuum chamber was pumped to a base pressure of less than $1 \times 10^{-5}$ mbar, the appropriate gas mixture (see additional details below) was introduced for sputtering.

Typical conditions used to deposit the layers are in Table I. The tungsten layer in parentheses was deposited only where interior glare reduction was sought (Example 3). The first 60 A of a top dielectric layer was deposited under especially mild conditions (lower wattage and lower oxygen partial pressure) to prevent damage to the underlying silver layer. Deposition times were varied to achieve the thicknesses specified. For a graduated metal layer thickness, the sputtering target was moved along the length of a 5×15 cm substrate at various rates as required to achieve the desired thickness profile.

TABLE I

| Layer | Air Flow (sccm) | O₂ Flow (sccm) | Pressure mBar | Power watts | Dep. Rate (A/sec) |
| --- | --- | --- | --- | --- | --- |
| tungsten oxide | 30 | 6 | 3.5 × 10⁻⁵ | 32 | 3 |
| silver | 30 | 0 | 2.5 × 10⁻⁵ | 29 | 10 |
| (tungsten) | 30 | 0 | 2.5 × 10⁻⁵ | 116 | 10 |
| tungsten oxide | 30 | 1 | 3.0 × 10⁻⁵ | 19 | 1 |
| tungsten oxide | 30 | 6 | 3.5 × 10⁻⁵ | 32 | 3 |

Optical properties were determined with a Perkin Elmer 330 UV/VIS/NIR spectrophotometer. When reflectance measurements were made the glass plate containing the layered solar screening film was placed nearest the integrating sphere. Laminates were prepared with the outer vapor deposited layer in face to face contact with a PVB interlayer in the form of 30 mil thick Saflex ® sheet. The sequential layers of a laminate were: coated glass substrate/PVB/glass. In preparing a laminate the coated glass/PVB/glass assembly was preheated at 150° C. for 15 min. and a pressure of 40 psi applied for 5 min. while maintaining such temperature.

With the pressure maintained the laminate was then allowed to cool to room temperature.

Abbreviations used in Examples are defined as follows:

Tv, Rv and Av = respectively, visible transmission, reflectance and absorption,

Ts, Rs and As = respectively, solar transmission, reflectance and absorption,

SR = solar energy rejection calculated under standard summer conditions specified in ASHRAE Handbook, 1985, chapter 27- i.e. % SR = 100% − %Ts − 0.27 × %As.

WO3 = tungsten oxide.

EXAMPLE 1

An integral gradient band was introduced into a three layer interference filter as a continuation of the metal layer by gradually increasing the thickness of a silver layer in a tungsten oxide/silver/tungsten oxide multilayer stack. The thickness of the silver layer was increased in the gradient metal band from about 110A to about 450A while both tungsten oxide layers on either side of the silver were held constant at about 400A. FIG. 3 schematically depicts the silver layer thickness profile versus potential position in a windshield while FIG. 2 shows region 27 as the actual windshield location of the gradient metal band.

After laminating 30 mil (0.76 mm) thick Saflex ® sheet to the upper tungsten oxide layer of the stack, the transmission (FIG. 4) and reflection (FIG. 5) spectra were taken in the high transmission interference filter segment and the zone of maximum thickness of the gradient band region (respectively labeled "IF" and "GB" in FIGS. 4 and 5) and the optical characteristics measured providing the following results:

TABLE 2

| Region | % Tv | % Rv | % As | % Rs | % SR |
| --- | --- | --- | --- | --- | --- |
| interference filter | 72 | 17 | 20 | 33 | 48 |
| gradient metal band | 12 | 78 | 18 | 74 | 87 |

Figure 4:
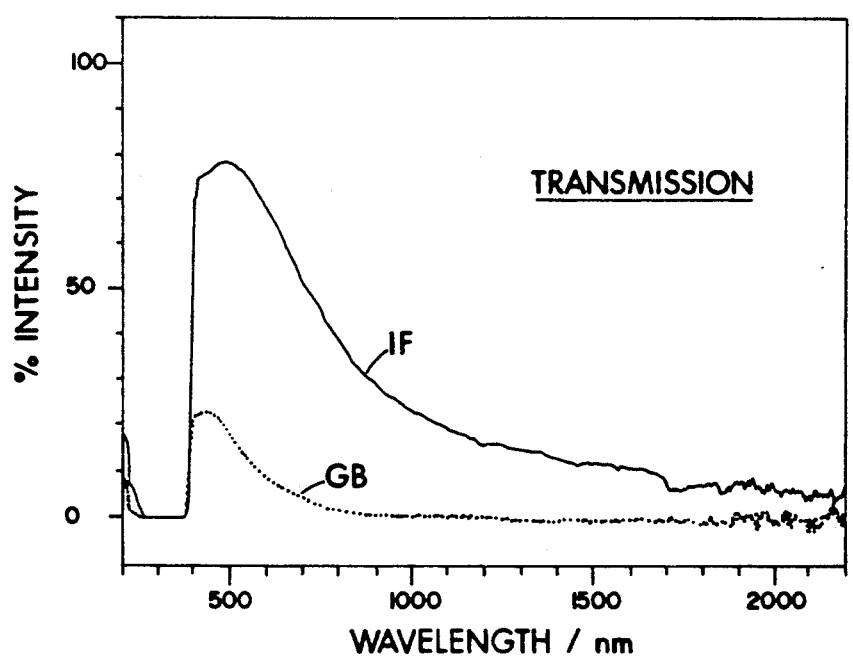
FIGS. 4, 5, 7 and 8 are normal incidence plots graphically illustrating measured transmission and reflection spectra in specific areas of laminates containing solar screening films of the invention.
Figure 5:
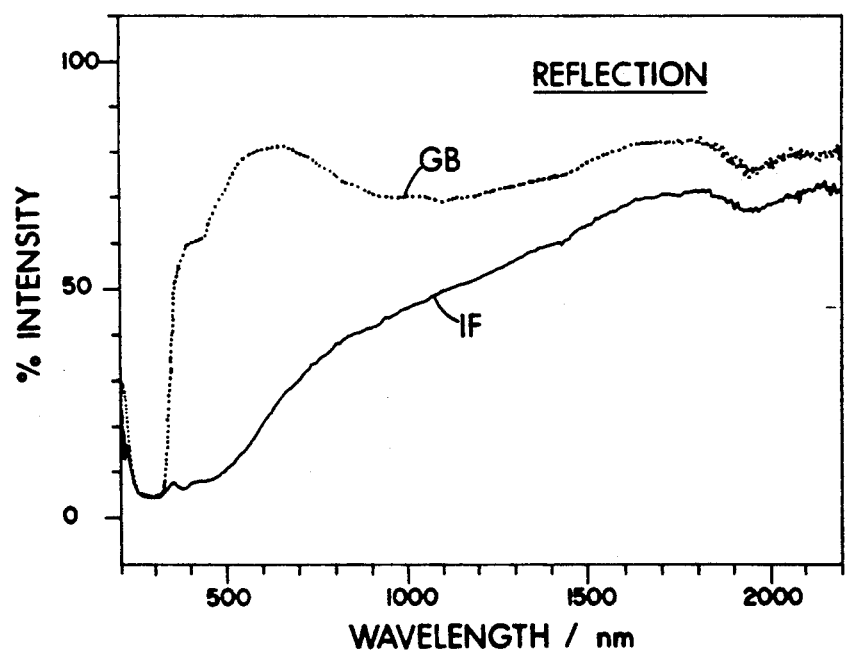

As apparent from FIG. 4 and Table 2, in the 400-700 nm range, visible light transmission of the interference filter segment through which a vehicle occupant would look when a full-size optical element of this construction is installed in a windshield, is desirably greater than 70% while reflection (FIG. 5) is 33%. On the other hand, reflective rejection in the gradient metal band region above an occupant's direct line of vision when such a film is positioned in a windshield is quite high as represented by the 74% Rs value in Table 2.

COMPARATIVE EXAMPLE 1A

This compares optical performance of the gradient metal structure of Example 1 with a dyed gradient band conventionally used as an integral plastic section of a plasticized polyvinyl butyral interlayer. Such interlayer when installed in a laminated glass windshield would conventionally provide a dyed color band (called "tinted" below) across the top of the windshield above the driver's direct field of vision and a clear, subjacent section (called "clear" below) opposite the direct field of vision through the windshield. Such a structure is typically shown in FIG. 1 of U.S. Pat. No.3,038,206. The particular interlayer of this Comparative Example had a blue gradient band and is available from Monsanto Company as Saflex ® TG45. The measured optical properties of such interlayer are in Table 3 following. Though not shown, the measured transmission spectra for the clear and tinted portions of the interlayer exactly tracked and were equal to each other in the near IR 700-3000 nm range,

TABLE 3

| Region | % Tv | % Rv | % As | % Rs | % SR |
|--------|------|------|------|------|------|
| Clear  | 88   | 8    | 14   | 7    | 17   |
| tinted | 12   | 5    | 46   | 6    | 40   |

Although the tinted section substantially reduces luminous transmission in the visible (400–700 nm) region, it provides no attenuation in the near IR region. Thus, though Tv is reduced to 12% in the tinted region, the overall solar rejection is only 40% in comparison with the 217% greater value of 87% SR in Example 1. The major solar rejection mechanism is absorptive in the tinted band as evidenced by 46% As which is not as effective as the major reflective rejection of 74% Rs achieved in Example 1.

EXAMPLE 2

To relate silver thickness to optical performance and explore functional gradient metal band thicknesses, samples were prepared as in Example 1 (i.e. three layer stacks of tungsten oxide/silver/tungsten oxide) each with the same thicknesses of tungsten oxide (450 A next to the glass substrate and 500A for the external top layer) but with silver layer thicknesses which varied between samples (though silver layer thickness in each sample was uniform). Optical properties are in Table 4 which shows solar rejection increasing as silver metal layer thickness increases.

TABLE 4

| Sample | Silver Thickness (A) | % Rs | % As | % Tv | % Rv | % SR |
|--------|---------------------|------|------|------|------|------|
| A57    | 120                 | 23.3 | 21.0 | 78.6 | 10.1 | 38.6 |
| A56    | 140                 | 28.7 | 22.0 | 75.2 | 13.5 | 44.8 |
| A63    | 160                 | 31.3 | 24.7 | 69.4 | 15.7 | 49.3 |
| A58    | 200                 | 40.0 | 22.4 | 62.8 | 23.5 | 56.4 |
| A62    | 300                 | 54.8 | 22.7 | 40.8 | 43.5 | 71.4 |
| A59    | 400                 | 67.4 | 19.6 | 24.4 | 63.8 | 81.7 |
| A64    | 500                 | 73.1 | 20.7 | 11.4 | 74.7 | 88.2 |
| A60    | 600                 | 77.5 | 18.7 | 7.2  | 82.6 | 91.2 |

From the above, about 160A is the maximum thickness for about 70% Tv. 500A gave 11.4% Tv which is comparable to that typically found in the darkest portion of dyed gradient bands (12% in Table 3).

EXAMPLE 3

Though a highly reflective metal gradient band is useful for solar rejection, depending on metal layer thickness, reflective glare into the eyes of occupant(s) within the vehicle passenger compartment can occur. This Example defines a structure for suppressing luminous reflection within a vehicle while maintaining the optical performance improvements achieved with a reflective metal gradient band described in Example 1.

Figure 7:
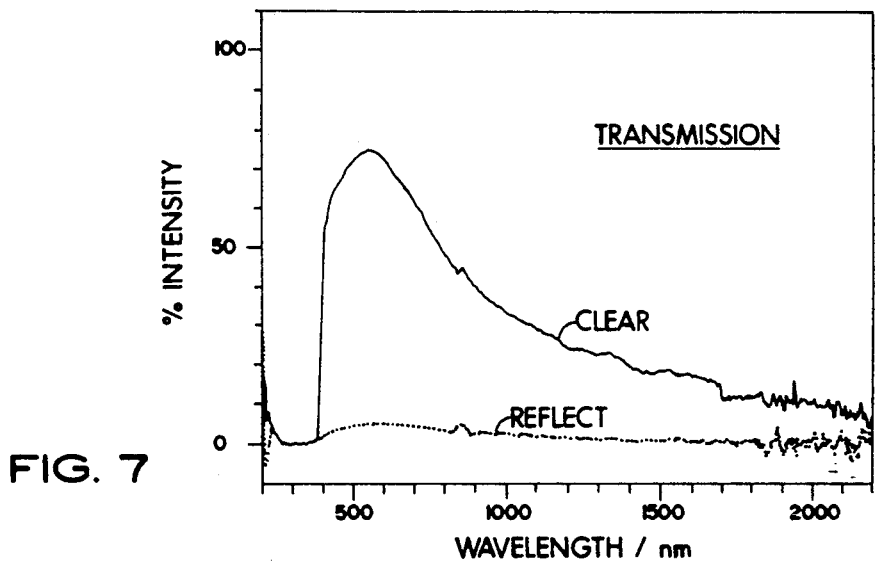
Figure 8:
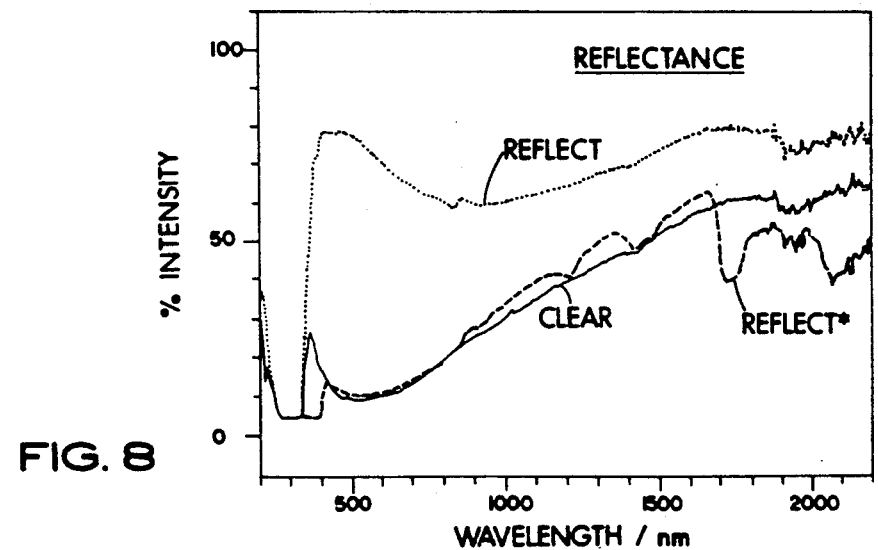

The approach is to introduce an additional metallic light-absorbing layer of graduated thickness between highly reflective gradient metal band regions and the interior of the vehicle. Tungsten metal deposited directly on a silver layer was used as the absorbing layer. Thus a prepared laminate had the following layer sequence: outboard 5×15 cm glass/tungsten oxide/graduated silver/graduated tungsten tungsten oxide/polyvinyl butyral sheet/inboard 5×15 cm glass. The thicknesses of the internal and external tungsten oxide dielectric layers were held constant at approximately 450A and 500A respectively across the length of the sample. As shown in FIG. 6, silver layer thickness was varied between 450A (representative, for example, of that usable with a windshield extension) and 110A (representative, for example, of that used in the high transmission interference filter component) while tungsten layer thickness was varied between 0A at the start of the gradient silver metal band and 200A at the end of the maximum 450A thickness silver metal band. The optical properties measured at opposite ends of the sample (i.e. at 450 and 110A silver layer thickness) are in Table 5, with the corresponding transmission and reflection spectra shown in FIGS. 7 and 8 respectively, the spectra for the various regions identified with the same nomenclature as in FIG. 4. The optical measurements specified for the reflect* region were measured with the incident beam approaching so as to reach the tungsten layer before the silver layer whereas the reverse was the case for the "clear" and "reflect" regions.

TABLE 5

| Region   | % Tv | % Rv | % As | % Rs | % SR |
|----------|------|------|------|------|------|
| clear    | 73.4 | 9.7  | 26.7 | 21.8 | 41.3 |
| reflect  | 5.0  | 74.0 | 28.2 | 68.4 | 89.0 |
| reflect* | 5.0  | 10.9 | 73.9 | 22.7 | 76.6 |

From these data it is evident that the tungsten layer is quite effective at suppressing luminous reflection (i.e. %Rv=10.9) when the coated glass is viewed from the tungsten rather than the silver side.

To demonstrate more precisely the effect of the anti-glare tungsten backing layer, several 5×5 cm samples of the following structure were prepared: outboard glass/tungsten oxide (450A)/silver (500A) tungsten (various thicknesses: 0A, 20A, 50A, 200A)/tungsten oxide (500A)/30 mil Saflex sheet/inboard glass. The optical properties in Table 6 were measured with the incident beam approaching from both inboard and outboard sides of a laminate sample.

TABLE 6

| Sample | Tungsten thickness (A) | % Tv | % Rv | % As | % Rs | % SR |
|--------|------------------------|------|------|------|------|------|
| A64    | 0 A                    | 11.4 | 74.7 | 20.7 | 73.1 | 88.2 |
| A64*   | 0 A                    | 11.4 | 72.7 | 25.0 | 68.8 | 87.1 |
| A83    | 20 A                   | 10.5 | 76.6 | 20.3 | 73.9 | 91.6 |
| A83*   | 20 A                   | 10.5 | 38.5 | 45.3 | 48.8 | 81.9 |
| A81    | 50 A                   | 8.7  | 76.3 | 21.7 | 73.2 | 89.0 |
| A81*   | 50 A                   | 8.7  | 25.7 | 53.8 | 41.2 | 80.5 |
| A82    | 200 A                  | 2.6  | 84.2 | 21.0 | 77.3 | 92.6 |
| A82*   | 200 A                  | 2.6  | 12.4 | 73.7 | 24.6 | 78.4 |

*measurement with incident beam approaching from inboard side.

The above results show that thickening the anti-glare tungsten layer increases suppression of luminous reflectivity but also decreases luminous transmission. From these results, when an anti-glare metal backing component is included in the solar screening film of the invention, thickness should range between 0 to 300A.

EXAMPLE 4

This shows the effect of grading the thickness of either one or more metal layers of a gradient band continuation containing plural metal layers.

Two families of samples were prepared. Family #1 had the general structure: $WO_3(350A)/Ag(100A)/WO_3(750A)/Ag(x)/WO_3(350A)$ where x varied from 100 to 600 A. The data for family #1 samples are given in Table 7.

The structure for family #2 was: $WO_3(350A)/Ag(x)/WO_3(750A)/Ag(x)/WO_3(350A)$ where x varied from 100 to 500 A. The silver layers were of equal thickness in each sample of family #2. The data for family #2 samples are given in Table 8.

TABLE 7

| Smp # | x (A) | % Tv | % Rv | % Rs | % As | % SR |
|---|---|---|---|---|---|---|
| H46 | 100 | 78 | 7 | 26 | 24 | 43 |
| H51 | 200 | 64 | 22 | 43 | 22 | 59 |
| H50 | 300 | 38 | 47 | 58 | 23 | 74 |
| H52 | 400 | 29 | 63 | 66 | 19 | 80 |
| H53 | 500 | 18 | 76 | 72 | 19 | 88 |
| H54 | 600 | 9 | 83 | 75 | 20 | 89 |

TABLE 8

| Smp # | x (A) | % Tv | % Rv | % Rs | % As | % SR |
|---|---|---|---|---|---|---|
| H46 | 100 | 78 | 7 | 26 | 24 | 43 |
| H59 | 200 | 62 | 15 | 47 | 26 | 65 |
| H62 | 250 | 48 | 29 | 55 | 24 | 73 |
| H60 | 300 | 37 | 41 | 60 | 23 | 77 |
| H61 | 400 | 15 | 64 | 69 | 23 | 86 |
| H63 | 500 | 7 | 75 | 72 | 24 | 90 |

As evident from Tables 7 and 8, thickening one or both silver layers leads to desirable effects including:

(1) increased solar rejection provided primarily by solar reflection (%Rs) which is considered the most effective rejection mechanism; and (2) decreased visible transmission (%Tv) so a driver or occupant is less subject to glare.

However, though thickening one or both silver layers provide the above advantages, the two approaches are not equivalent and thickening only one layer is preferred for the following reasons:

(1) By thickening only one silver layer (Table 7), reflected color across the gradient band became either gradually more gold or gradually more silver depending on which side the sample was viewed from. The visually perceived color (i.e. gold or silver) was reflectively uniform showing change as the silver layer was thickened. On the other hand when the thickness of both silver layers was varied (Table 8) the reflected color was first red and then at greater silver thicknesses became gold or silver colored. This variation in color observed across the gradient band for family #2 coatings is probably undesirable.

(2) Although all samples were made with the same sputter coater and consequently had the same degree of thickness nonuniformity, those with both silver layers thickened appeared much less uniformly colored in reflection and transmission. This strong sensitivity to unavoidable thickness nonuniformity exhibited by family #2 samples is because of the rapid change in reflection intensity (or transmission) over relatively narrow wavelength bands. The sensitivity of family #2 samples to film thickness would make these coatings more difficult to produce, particularly on large areas.

The foregoing Examples 1 and 2 illustrate advantages realized using a gradient silver layer in a windshield rather than a dyed PVB layer. These advantages are as follows:

(1) Solar rejection for a given visible transmission with a metal gradient is higher than with a dyed gradient. For example both the dyed gradient and the metal gradient in Exs. 1 and 1A (Tables 2 and 3) had luminous transmission (Tv) of about 12% in the darkest region of the gradient band; however, the metal gradient sample gave 87% SR versus 40% SR with the dyed gradient. Thus the metal gradient would result in a significantly reduced solar heat load permitting use of a smaller air conditioning unit in a vehicle.

(2) The metal gradient band should provide much better temperature control during soaking than a dyed gradient which will become increasingly important as front and rear windows in automobiles advance into the roof area. It is likely that a highly reflective section extending from the top of the high transmission interference filter segment of a windshield across the top of the vehicle to the clear portion of the rear window will result in lower soaking temperatures than will result with a solid painted roof. For example, solar reflectance of Krylon gloss white and gloss black paint was determined to equal 44% and 4%, respectively. The reflective region of a metal gradient has substantially higher solar reflectance than even white paint (e.g. 74% vs. 44%), suggesting that the metal gradient layer would be more effective at suppressing temperature rise in parked closed autos.

While certain specific embodiments of the invention have been described with particularity, various modifications will occur to those skilled in the art. The scope of the invention, therefore, is limited solely by the scope of the following claims.

I claim:

1. A solar screening film for a motor vehicle windshield comprising:
   (a) an interference filter segment comprising two or more light-reflecting metal layers, each surface of which is contiguous with a dielectric layer; and
   (b) an integral gradient band continuation of said interference filter above the direct line of vision through a windshield when said solar screening film is disposed in a motor vehicle, for reflective rejection of infra-red solar energy, said band including an extension of one of the light-reflecting metal layers gradually increasing in thickness toward a marginal edge of the film.

2. The film of claim 1 wherein the two or more light-reflecting metal layers of the interference filter segment are of substantially uniform thickness.

3. The film of claim 2 wherein the gradient band continuation includes extensions of each of the dielectric layers of the interference filter segment.

4. The film of claim 3 wherein the thicknesses of the extensions of the dielectric layers of the gradient band continuation are substantially the same as the thicknesses of the dielectric layers of the interference filter segment.

5. The film of any of claims 1, 2, 3 or 4 wherein the varying thickness of the metal layer of the gradient band continuation increases from about 60 to 200 Angstroms at the confluence with the interference filter segment to about 200 to 1000 Angstroms.

6. The film of claim 5 wherein each metal layer of the interference filter segment and of the gradient band continuation comprises silver.

* * * * *